(12) United States Patent
Sandstrom et al.

(10) Patent No.: US 7,995,637 B2
(45) Date of Patent: Aug. 9, 2011

(54) GAS DISCHARGE LASER CHAMBER

(75) Inventors: Richard L. Sandstrom, Encinitas, CA (US); William N. Partlo, Poway, CA (US); Daniel J. W. Brown, San Diego, CA (US); Bryan G. Moosman, San Marcos, CA (US); Tae H. Chung, Murrieta, CA (US); Thomas P. Duffey, San Diego, CA (US); James J. Ferrell, Temecula, CA (US); Terance Hilsabeck, San Marcos, CA (US)

(73) Assignee: Cymer, Inc., San Diego, CA (US)

( * ) Notice: Subject to any disclaimer, the term of this patent is extended or adjusted under 35 U.S.C. 154(b) by 0 days.

(21) Appl. No.: 12/603,486

(22) Filed: Oct. 21, 2009

(65) Prior Publication Data

US 2010/0142582 A1    Jun. 10, 2010

Related U.S. Application Data

(60) Provisional application No. 61/107,341, filed on Oct. 21, 2008.

(51) Int. Cl.
*H01S 3/22* (2006.01)
(52) U.S. Cl. ................................ 372/58; 372/55
(58) Field of Classification Search .............. 372/55–58
See application file for complete search history.

(56) References Cited

U.S. PATENT DOCUMENTS

| 6,018,537 | A | 1/2000 | Hofmann et al. |
| 6,128,323 | A | 10/2000 | Myers et al. |
| 6,212,211 | B1 | 4/2001 | Azzola et al. |
| 6,317,447 | B1 * | 11/2001 | Partlo et al. ................. 372/57 |
| 6,330,261 | B1 | 12/2001 | Ishihara et al. |
| 6,442,181 | B1 | 8/2002 | Oliver et al. |
| 6,477,193 | B2 | 11/2002 | Oliver et al. |
| 6,549,551 | B2 | 4/2003 | Ness et al. |
| 6,553,049 | B1 | 4/2003 | Besaucele et al. |
| 6,567,450 | B2 | 5/2003 | Myers et al. |
| 6,618,421 | B2 | 9/2003 | Das et al. |
| 6,625,191 | B2 | 9/2003 | Knowles et al. |
| 6,654,403 | B2 | 11/2003 | Ujazdowski et al. |
| 7,203,217 | B2 * | 4/2007 | Bor ............................. 372/61 |
| 7,522,650 | B2 * | 4/2009 | Partlo et al. .................. 372/59 |
| 2005/0226301 | A1 * | 10/2005 | Partlo et al. ................. 372/59 |
| 2006/0291517 | A1 | 12/2006 | Gillespie et al. |
| 2007/0071058 | A1 | 3/2007 | Amada et al. |

* cited by examiner

*Primary Examiner* — Minsun Harvey
*Assistant Examiner* — Phillip Nguyen
(74) *Attorney, Agent, or Firm* — Martine Penilla & Gencarella, LLP

(57) ABSTRACT

One aspect of the disclosed subject matter describes a gas discharge laser chamber. The gas discharge laser chamber includes a discharge region formed between a first electrode and a second electrode, a tangential fan for circulating gas through the discharge region, wherein the fan is proximate to an input side of the discharge region, an input side acoustic baffle proximate to the input side of the discharge region. The input side acoustic baffle includes a vanishing point leading edge, a vanishing point trailing edge, a gas flow smoothing offset surface aligning a gas flow from a surface of the input side acoustic baffle to an input side of a cathode support in the discharge region, a plurality of ridges separated by a plurality of trenches, wherein the plurality of ridges and the plurality of trenches are aligned with a direction of gas flow through the discharge region and wherein the plurality of ridges have a random pitch between about 0.3 and about 0.7 inch.

25 Claims, 15 Drawing Sheets

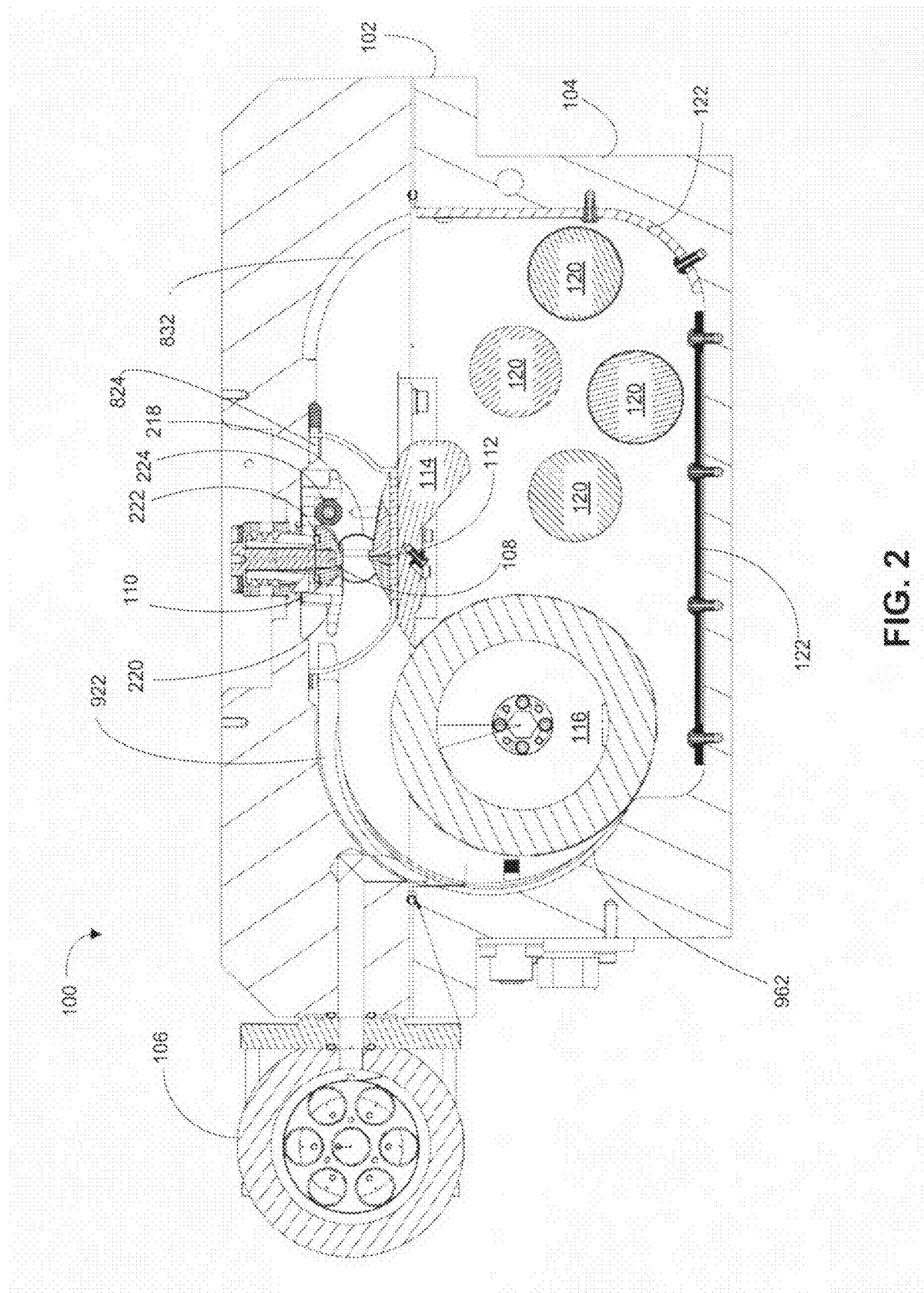

GAS DISCHARGE LASER CHAMBER

This application claims priority from U.S. Provisional Patent Application No. 61/107,341 filed on Oct. 21, 2008 and entitled "Gas Discharger Laser Chamber," which is incorporated herein by reference in its entirety for all purposes.

BACKGROUND

The disclosed subject matter relates generally to gas discharge lasers, and more particularly, to methods and systems for increasing service life of a gas discharge laser chamber.

Electric discharge gas lasers are well known and have been available since soon after lasers were invented in the 1960s. A high voltage discharge between two electrodes excites a laser gas to produce a gaseous gain medium. A resonance cavity containing the gain medium permits stimulated amplification of light which is then extracted from the cavity in the form of a laser beam. Many of these electric discharge gas lasers are operated in a pulse mode.

Excimer lasers are one type of electric discharge gas laser. Excimer lasers have been known since the mid 1970s. A description of an excimer laser, useful for integrated circuit lithography, is described in U.S. Pat. No. 5,023,884 issued Jun. 11, 1991 entitled "Compact Excimer Laser." The '884 patent has been assigned to Assignee of the present application. The '884 patent is hereby incorporated herein by reference for all purposes. The excimer laser described in '884 patent is a high repetition rate pulse laser though the laser disclosed there operated at about one third to one fourth of the pulse repetition rate required for contemporary laser systems used in photolithography.

These excimer lasers are typically used "around-the-clock" in an integrated circuit fabrication line in an integrated circuit lithography process. The integrated circuit lithography process produces many thousands of valuable integrated circuits per hour. Down-time in an integrated circuit fabrication line is very expensive. For this reason most of the components in an excimer laser are organized into modules which can be replaced within a few minutes and thereby minimize laser down time.

Electric discharge gas lasers of the type described in '884 patent utilize an electric pulse power system to produce the electrical discharges, between the two elongated electrodes. In such electric discharge gas laser systems, a direct current power supply charges a capacitor bank called a "charging capacitor" or "$C_0$" to a predetermined and controlled voltage called the "charging voltage" for each pulse. The magnitude of this charging voltage may be in the range of about 800-1000 volts, and stepped up to about 16,000 volts (or greater). After $C_0$ has been charged to the predetermined voltage, a solid state switch is closed allowing the electrical energy stored on $C_0$ to pass through a series of magnetic pulse compression circuits and a step-up transformer to charge a so-called peaking capacitor $C_p$, which discharges very quickly across a pair of electrodes which produce the lasing discharge. Each discharge lasts about 20 to 50 ns.

Gas discharge laser chambers have a service life defined by several operational aspects. Two of the major service life limitations are the electrode life and the cleanliness of the laser window that passes the laser from the gas discharge chamber for use outside the gas discharge chamber. The pair of electrodes include a cathode and an anode. The electrodes are eroded by each of the electrical discharges across a discharge region in the space between the anode and the cathode. Each discharge ionizes the gas between the electrodes and erodes a portion of the material from one or both of the electrodes and releases the ions into the gas discharge laser chamber. The eroded material can combine with fluorine in the laser gas to form metal fluoride particles.

A mixture of gases is flowed through the discharge region to remove the ions from the discharge region before a subsequent discharge across the cathode to the anode (or vice versa). The particles can precipitate out of the gas flow and attach themselves onto the various inner surfaces of the gas discharge laser chamber.

A fan circulates the gases in the gas discharge laser chamber through the discharge region between the anode and the cathode. As the frequency of discharges increases the length of the time interval between each discharge is reduced. The fan must circulate the gases through the discharge region sufficiently to remove the ions and particles from the discharge region in each time interval. The laser should operate "arc-free", that is without arcing between the high voltage electrode and grounded portions of the gas discharge laser chamber nearby through ions or particles nearby the inter-electrode discharge region which have not been sufficiently cleared from the discharge region by the circulating flow introduced by the circulating fan before the next subsequent electrical discharge. Therefore, as the time interval between each discharge is reduced the "arc-free velocity" of gases flowing through the discharge region must also increase in speed and/or efficiency, defining for each laser configuration and output pulse repetition rate an "arc-free fan speed" or "arc-free blower speed" of some definable RPM.

What is needed is to increase the service life of the gas discharge laser chamber is a longer life electrode and a more efficient removal of the ions and particles from the discharge region.

SUMMARY

Broadly speaking, the disclosed subject matter fills these needs by increasing the service life of the gas discharge laser chamber including a longer life electrode and a more efficient removal of the ions and particles from the discharge region. It should be appreciated that the disclosed subject matter can be implemented in numerous ways, including as a process, an apparatus, a system, or a device. Several inventive embodiments of the disclosed subject matter are described below.

One aspect of the disclosed subject matter describes a gas discharge laser chamber. The gas discharge laser chamber includes a discharge region formed between a first electrode and a second electrode, a tangential fan for circulating gas through the discharge region, wherein the fan is proximate to an input side of the discharge region, an input side acoustic baffle proximate to the input side of the discharge region. The input side acoustic baffle includes a vanishing point leading edge, a vanishing point trailing edge, a gas flow smoothing offset surface aligning a gas flow from a surface of the input side acoustic baffle to an input side of a cathode support in the discharge region, a plurality of ridges separated by a plurality of trenches, wherein the plurality of ridges and the plurality of trenches are aligned with a direction of gas flow through the discharge region and wherein the plurality of ridges have a random pitch between about 0.3 and about 0.7 inch.

The plurality of trenches can include a corresponding plurality of trench faces extending from each one of the plurality of trenches to the adjacent one of the plurality of ridges and wherein each one of the plurality of trench faces forms an angle with a line normal to the acoustic baffle and centered on the corresponding one of the trenches, wherein the angle has a random measure of between about 20 and about 60 degrees. In at least one aspect of the disclosed subject matter not more than one of the corresponding angles formed by two adjacent trench faces is a 45 degree angle to the common line normal to the acoustic baffle. The input side acoustic baffle can have a back side and wherein the back side of the input side acoustic baffle conforms to an inner surface of the gas discharge chamber.

Each one of the plurality of trenches has a random depth from the adjacent one of the plurality of ridges of between about 0.1 and about 0.3 inch. The leading edge of the input side acoustic baffle is between about a 9-o'clock portion and about a 6-o'clock portion of the fan. The input side acoustic baffle is formed in multiple segments between the leading edge and the trailing edge of the input side acoustic baffle.

The gas discharge laser chamber can also include a second acoustic baffle proximate to the output side of the discharge region and conforming to a inner surface of the gas discharge laser chamber. The discharge region can be formed between a first electrode supported in a first electrode support and a second electrode supported in a second electrode support and wherein at least one if the first electrode and the second electrode extends between about 1.8 and about 2.8 mm into the discharge region.

The gas discharge laser chamber can also include a flow smoothing filler in the cathode support. The gas discharge laser chamber can also include a second offset surface at an inlet of the fan. The gas discharge laser chamber can also include a plurality of heat exchangers, wherein the plurality of heat exchangers are proximate to at least one of the bottom and a side opposite the fan.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings.

FIG. 2 is a side view of the gas discharge laser chamber in accordance with an embodiment of the disclosed subject matter.

DETAILED DESCRIPTION

Several exemplary embodiments for increasing the service life of the gas discharge laser chamber including a longer life electrode and a more efficient removal of the ions and particles from the discharge region will now be described. It will be apparent to those skilled in the art that the disclosed subject matter may be practiced without some or all of the specific details set forth herein.

Figure 1A:
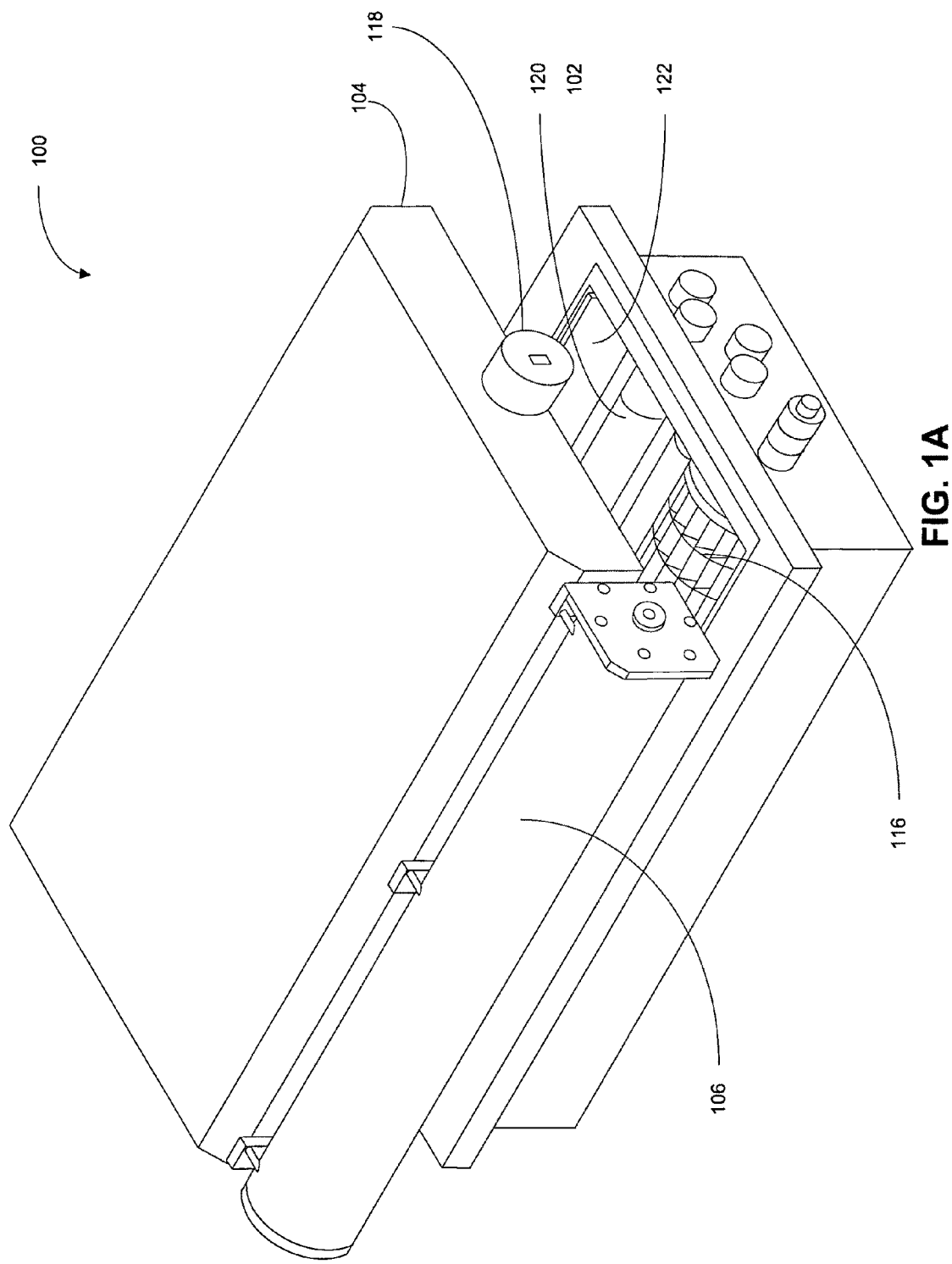
FIG. 1A is gas discharge laser chamber, in accordance with an embodiment of the disclosed subject matter.
Figure 1B:
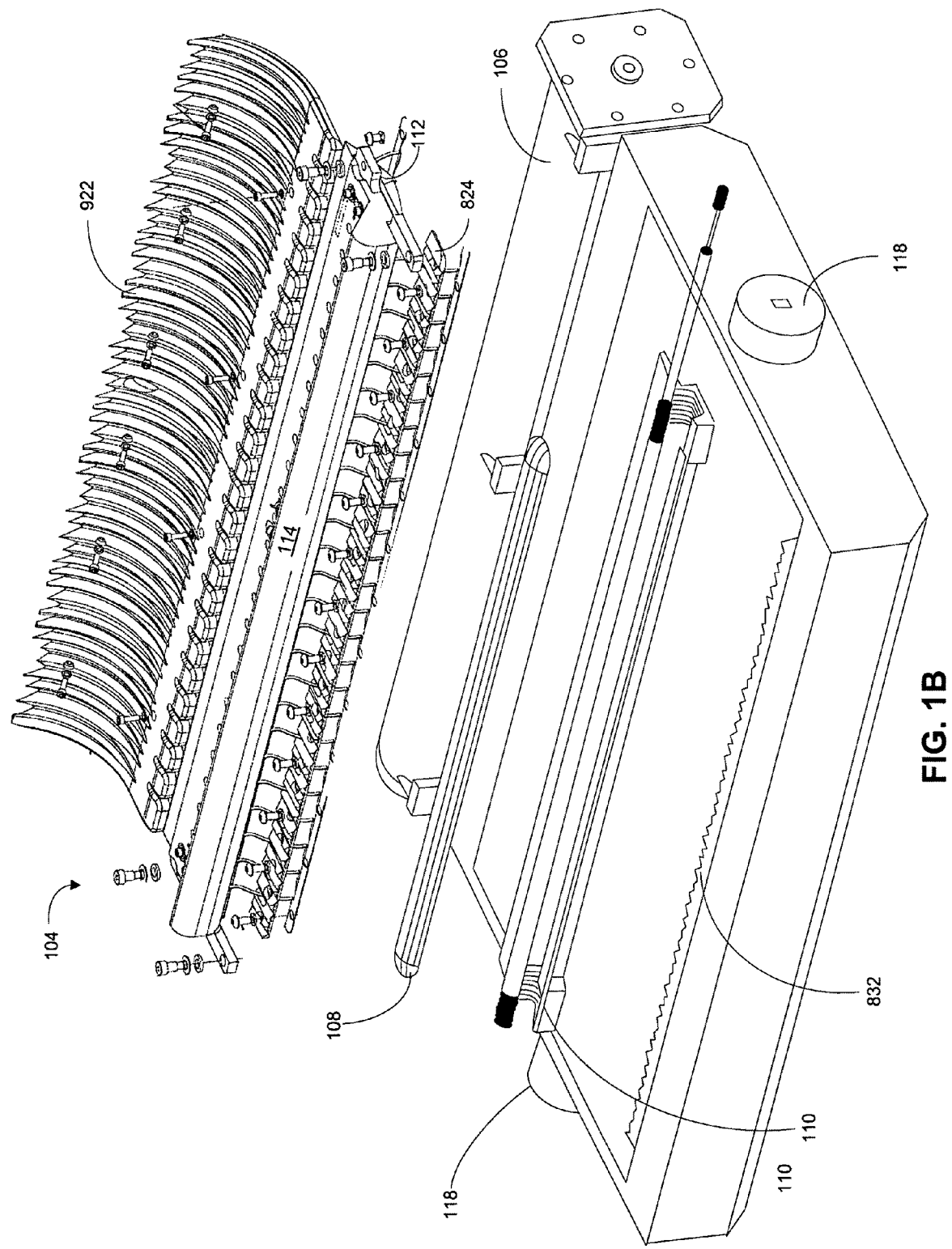
FIG. 1B is an exploded view of top cover of the gas discharge laser chamber 100, in accordance with an embodiment of the disclosed subject matter.

FIG. 1A is a gas discharge laser chamber 100, in accordance with aspects of an embodiment of the disclosed subject matter. FIG. 1B is an exploded view of top cover 104 of the gas discharge laser chamber 100, in accordance with aspects of an embodiment of the disclosed subject matter. FIG. 2 is a side view of the gas discharge laser chamber 100 in accordance with aspects of an embodiment of the disclosed subject matter. The gas discharge laser chamber 100 includes top cover 102 and a bottom chamber body 104. A cross flow fan (also known as a tangential fan) 116, a plurality of heat exchangers 120 and dust trap screens 122 are included in the bottom chamber body 104.

The top cover 102 includes a first electrode 108, also known as a cathode, a second electrode 112, also known as an anode, a first electrode support 110, a second electrode support 114, and multiple acoustic baffles 824, 922, 932, 962. The multiple acoustic baffles 824, 922, 932, 962 extend the length of the first electrode 108 and the second electrode 112 as will be described in more detail below. An extension or filler 220 has been added to the cathode insulator support 110. The extension 220 fills a previous gap of substantially the same shape between the cathode insulator support 110 and the cathode support structure 222. The extension 220 is a flow smoothing and acoustic reflection mitigating filler as it smoothes the flow of the gas flowing through the discharge region 218 and also reduces acoustic energy reflection from the previous space therefore increases the efficiency of the gas flowing through the discharge region 218. It should also be understood that the extension 220 or a substantially similarly shaped extension, could exchange locations with the preionizer 224

Figure 3:
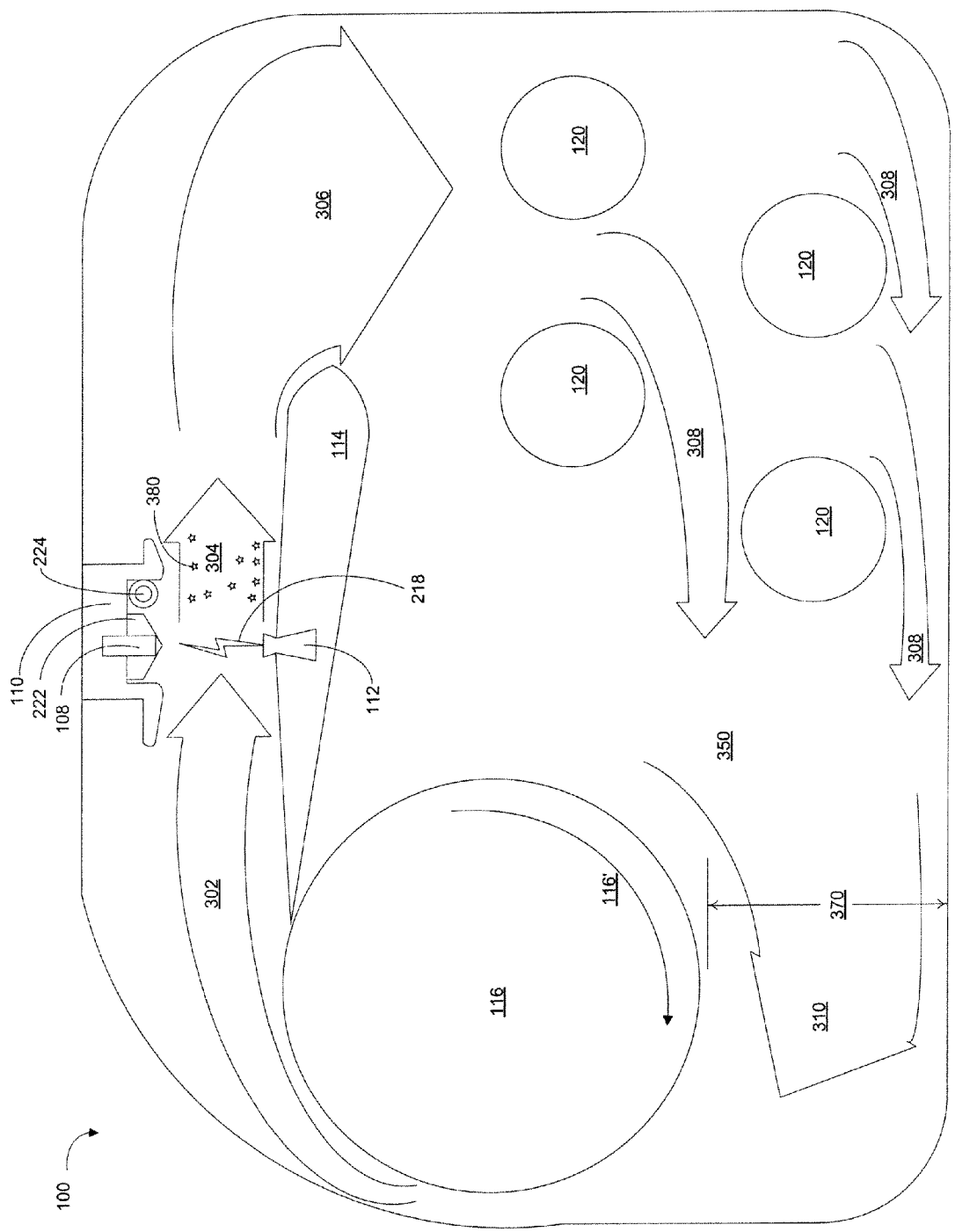
FIG. 3 is a side view of an ideal gas flow through the gas discharge laser chamber, in accordance with aspects of an embodiment of the disclosed subject matter.
Figure 4:
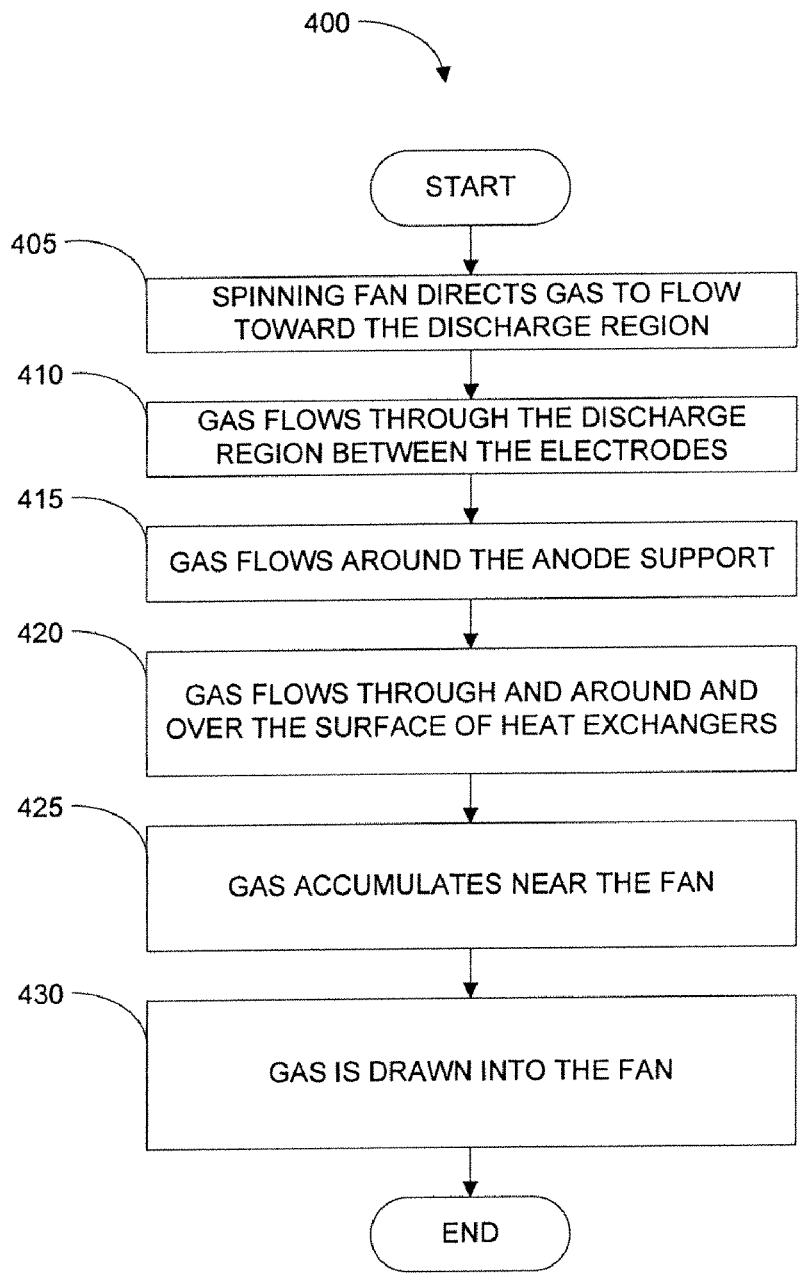
FIG. 4 is a flowchart of the method and operations of the ideal flow ideal gas flow through the gas discharge laser chamber, in accordance with aspects of an embodiment of the disclosed subject matter.

FIG. 3 is a side view of an ideal gas flow through the gas discharge laser chamber 100, in accordance with aspects of an embodiment of the disclosed subject matter. FIG. 4 is a flowchart of the method and operations 400 of the ideal flow ideal gas flow through the gas discharge laser chamber 100, in accordance with aspects of an embodiment of the disclosed subject matter. In an operation 405 the fan 116 is spinning in a direction 116' which causes gas to flow 302 smoothly toward the discharge region 218. In an operation 410, the gas flow 304 flows through the discharge region 218, between the electrodes 108, 112.

Once past the electrodes 108, 112, the gas flow 306 flows around the anode support 114 in an operation 415. In an operation 420, the gas flow 308 flows through and around and over the respective surface of the heat exchangers 120. Once past the heat exchangers 120, the gas 310 accumulates in the space 350 near the fan 116 and then can be gathered up and drawn into the fan 116 in respective operation 425 and 430. The cycle of operations 405-430 of the gas flow repeats as the fan 116 continues to spin in direction 116'.

As described above in FIGS. 3 and 4, the gas flows around the gas discharge laser chamber 100 however the gas does not flow as smoothly as would be desired. The following figures describe several disruptions to the smooth gas flow through the gas discharge laser chamber 100.

Figure 5:
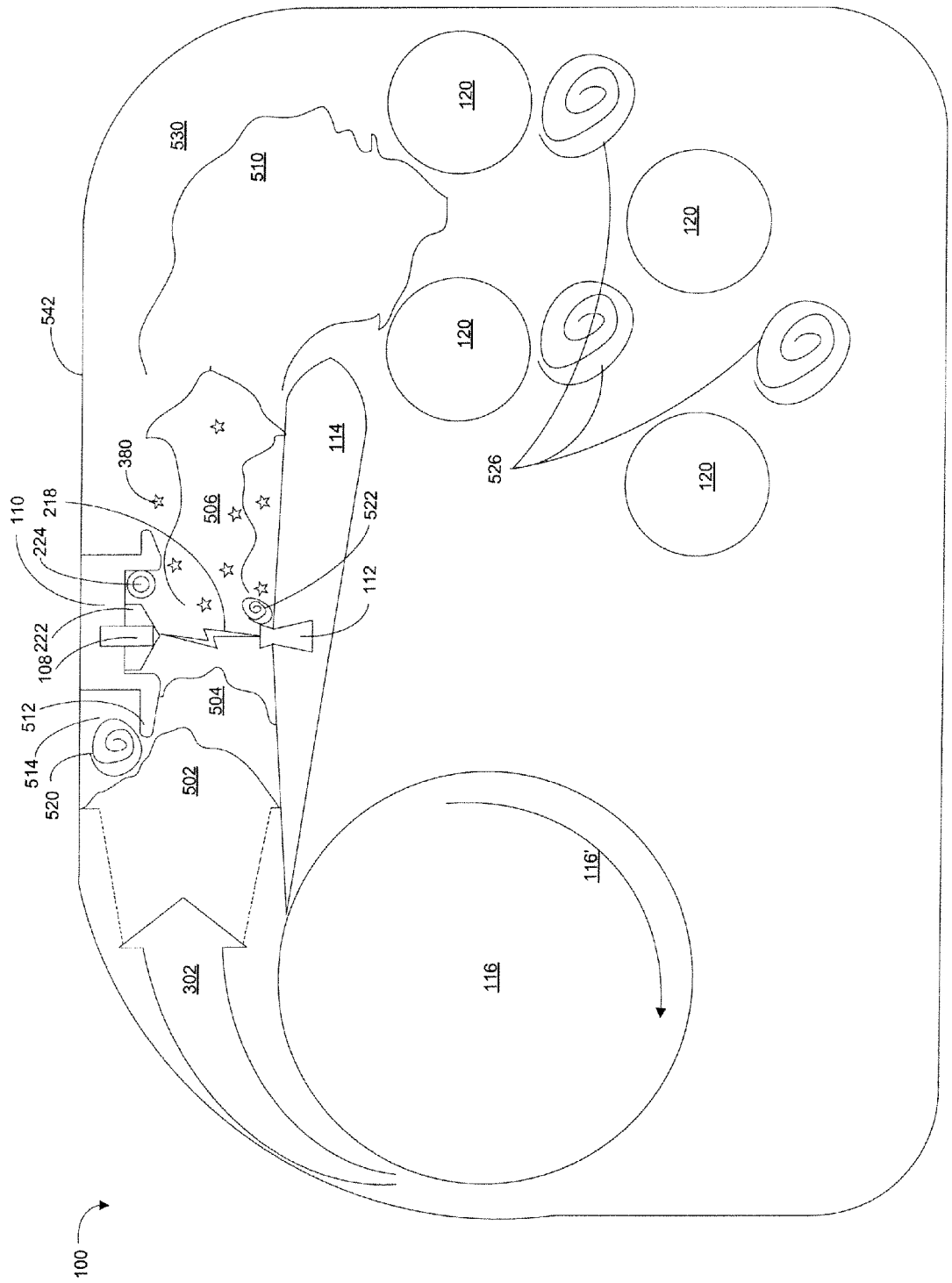
FIG. 5 is a side view of a turbulent gas flow due to protrusions in the gas discharge laser chamber, in accordance with aspects of an embodiment of the disclosed subject matter.

FIG. 5 is a side view of a turbulent gas flow due to protrusions in the gas discharge laser chamber 100, in accordance with aspects of an embodiment of the disclosed subject matter. As described above the fan 116 spins in direction 116' forcing the gas 302 toward the discharge region 218. However for various electrical performance reasons a cathode support 110 has a protrusion 512 and a space 514 and the electrodes 108, 112 protrude into the discharge region 218. As the gas flows toward the discharge region 218 the gas flow interacts with protrusion 512 and space 514 resulting in eddy currents and/or other disturbances of gas flow 520 emanate from the protrusion 512 and space 514 that disrupt the gas flow 502.

Once past the protrusion 512, the now disrupted gas flow encounters the protruding electrode 112. Additional eddy currents and/or other disturbances of gas flow 522 can emanate from the anode 112. The additional eddy currents and/or other disturbances 522 further disrupt the gas flow 504. This disrupted gas flow 504 has a reduced efficiency through the discharge region 218 and reduces the effective gas velocity through the discharge region 218 and also reduces the consistency and the speed of the removal of the ions and other particles 380 from the discharge region 218. The reduced efficiency is also evidenced by increased current demand by the fan 116.

Once past the discharge region 218, the now even further uneven gas flow encounters a relatively gradually expanding space 530 between the anode support 114 and the upper inner surface 542 of the gas discharge laser chamber 100 or other features within the laser chamber 100. The gradually expanding space 530 somewhat slows the gas flow 506. The slowed gas flow 510 flows past of the anode support 114 and encounters the heat exchangers 120. Eddy currents and/or other disturbances of gas flow 526 emanate from the heat exchangers 120 that again disrupt the gas flow 510 resulting in uneven gas flow 510 through the expanding space 530.

Figure 6:
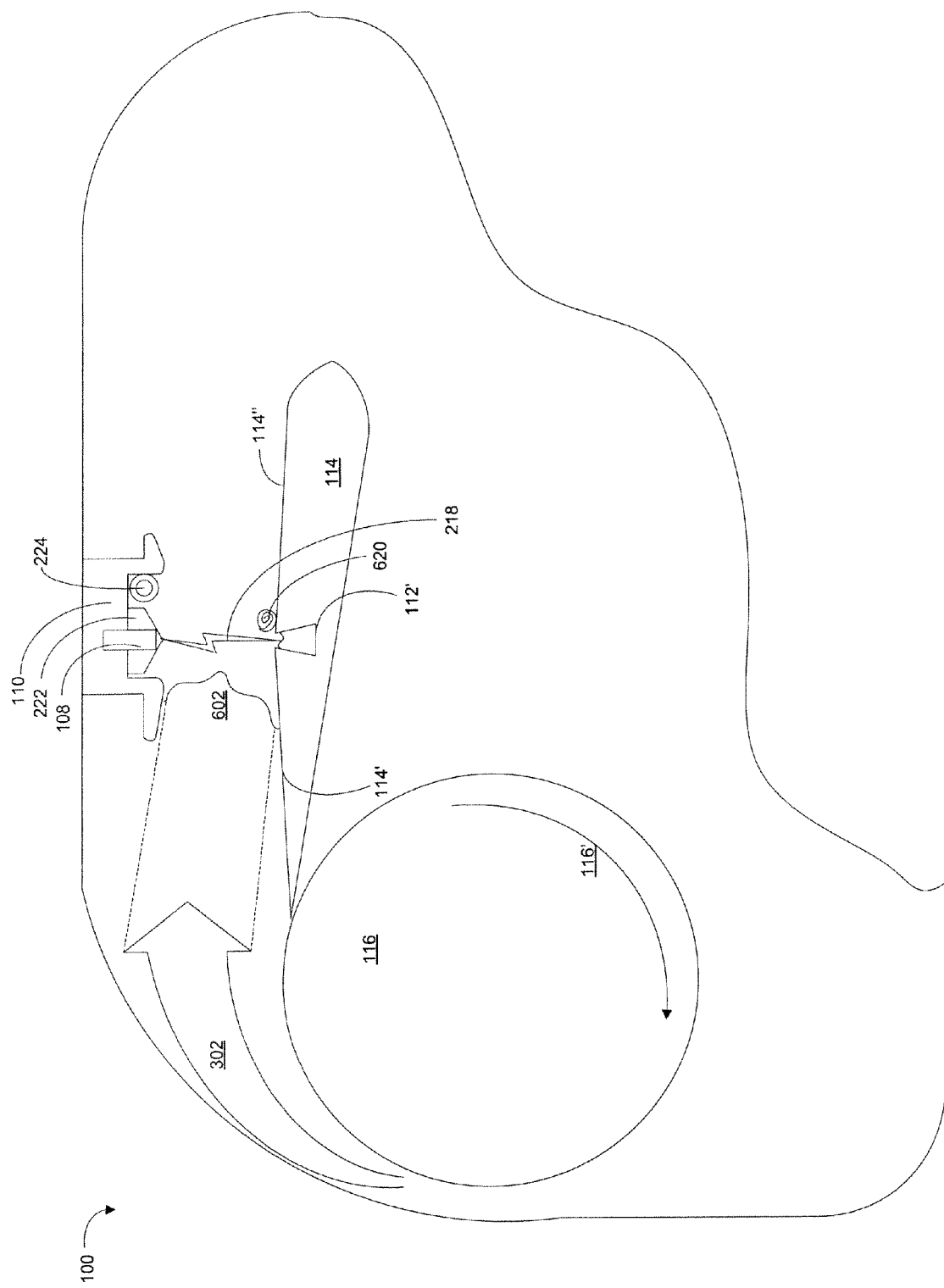
FIG. 6 is a side view of a turbulent gas flow due to a recessed electrode 112' in the gas discharge laser chamber, in accordance with aspects of an embodiment of the disclosed subject matter.

Protrusions and other interferences described in FIG. 5 are not the only disruptions to the smooth gas flow through the gas discharge laser chamber 100. FIG. 6 is a side view of a turbulent gas flow due to a recessed electrode 112' in the gas discharge laser chamber 100, in accordance with aspects of an embodiment of the disclosed subject matter. As the gas discharge laser chamber 100 is used the electrodes 108, 112 begin to erode away. By way of example the anode 112' can erode to a level recessed below the surface 114' of the anode support 114. As a result, as the gas 602 flows through the discharge region 218, eddy currents and/or other disturbances of gas flow 620 can be reflected from the recessed anode 112' that can further disrupt the gas flow through the discharge region.

Figure 7:
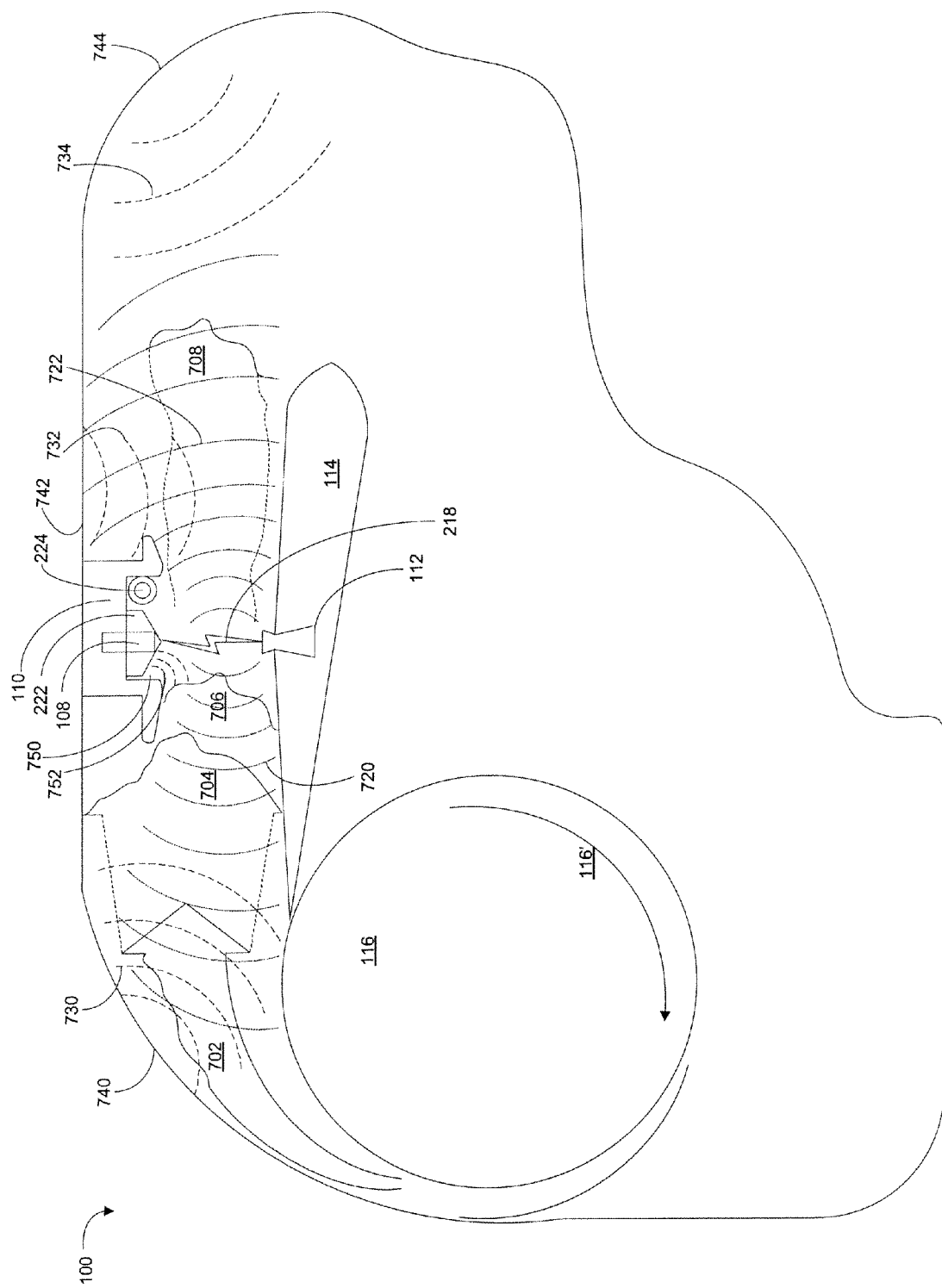
FIG. 7 is a side view of turbulent gas flow due to acoustic energy generated within the gas discharge laser chamber, in accordance with aspects of an embodiment of the disclosed subject matter.

Physical structures are not the only source of turbulence in the gas flow through the gas discharge laser chamber 100. FIG. 7 is a side view of turbulent gas flow due to acoustic energy 720, 722, 730, 732, 734 generated within the gas discharge laser chamber 100, in accordance with aspects of an embodiment of the disclosed subject matter. As described above the gas discharge laser chamber is discharged many times per second typically between about 1000 and about 6000 times per second and sometimes even more than 6000 discharges per second. Each discharge in the discharge region 218 is very powerful and produces a shockwave of acoustic energy 720, 722 traveling around the gas discharge laser chamber 100. The acoustic energy 720, 722 radiates outward from the discharge region 218 for each discharge event. Reflected acoustic energy 730, 732, 734 is reflected toward the discharge region 218 when the acoustic energy 720, 722 impinges on other structures and surfaces within the laser gas discharge chamber 100.

By way of example, when acoustic energy 720 impinges on inner surface 740 of the gas discharge laser chamber 100, reflected acoustic energy 730 is reflected back toward the discharge region 218. Similarly, when acoustic energy 722 impinges on inner surface 742 of the gas discharge laser chamber 100, reflected acoustic energy 732 is reflected back toward the discharge region 218. Also similarly, when acoustic energy 722 impinges on inner surface 744 of the gas discharge laser chamber 100, reflected acoustic energy 734 is reflected back toward the discharge region 218. The gas flows 702, 704, 706 and 708 toward, through and away from the discharge region 218 is disrupted by the acoustic energy 720, 722 radiating outward from the discharge region 218 and the reflected acoustic energy 730, 732, 734 reflecting toward the discharge region. Acoustic energy 720 can also impinge on insulator space 750 resulting in reflected acoustic energy 752 being reflected directly toward the discharge region.

Figure 8:
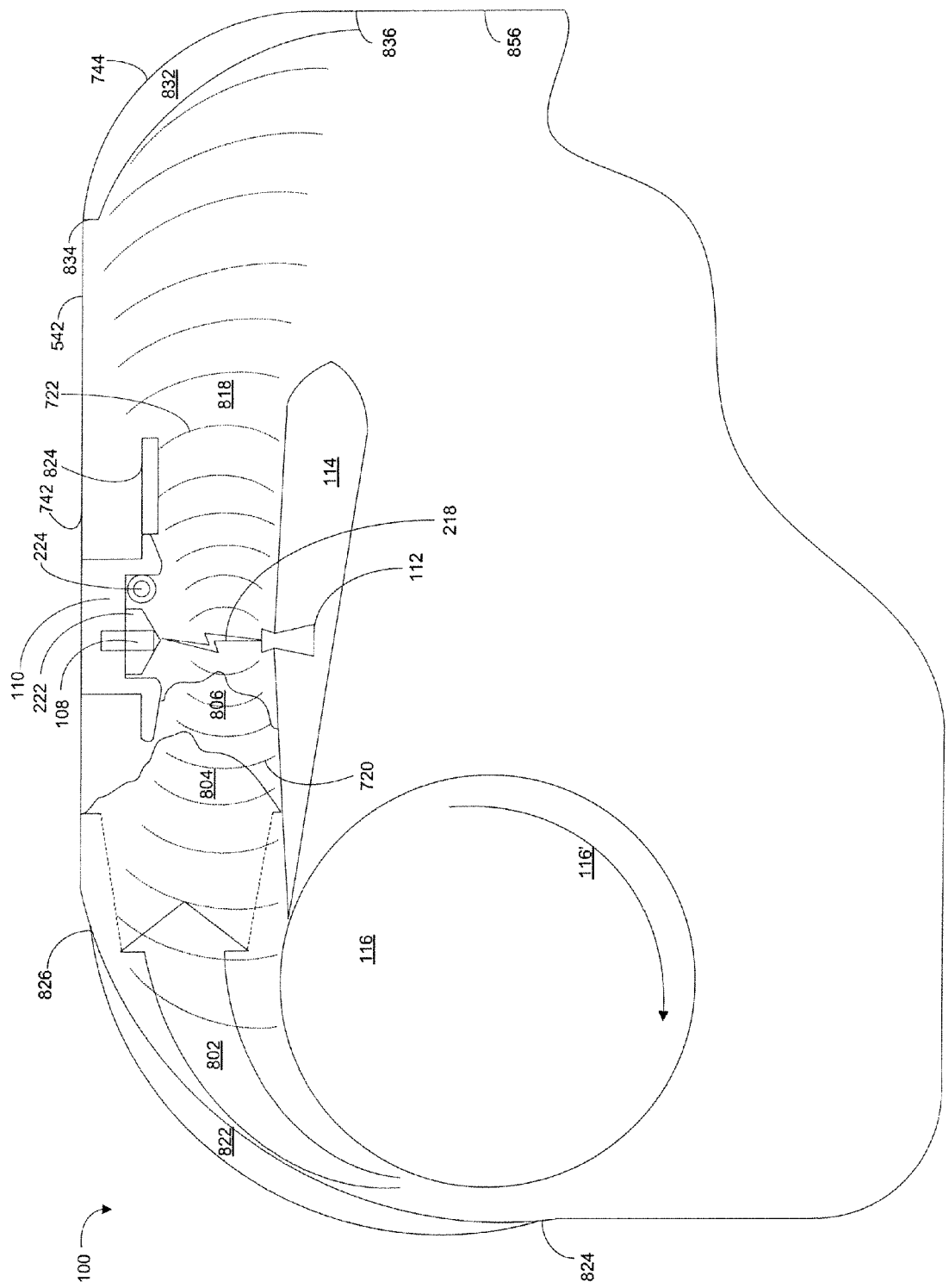
FIG. 8 is a side view of acoustic baffles within the gas discharge laser chamber, in accordance with aspects of an embodiment of the disclosed subject matter.

FIG. 8 is a side view of acoustic baffles 822, 824, 832 within the gas discharge laser chamber 100, in accordance with aspects of an embodiment of the disclosed subject matter. Input side acoustic baffle 822 divides up and randomly scatters the acoustic energy 720 radiating from the discharge region 218 toward the surface 740 of the gas discharge laser chamber 100 so as to minimize any acoustic energy reflected from the surface 740 (e.g., reflected acoustic energy 730 shown in FIG. 7 above). Similarly, acoustic baffles 824 and 832 break up and randomly scatter acoustic energy 722 radiating toward the output side 818 of the discharge region 218 so as to minimize any acoustic energy reflected from the surfaces 742 and 744 (e.g., reflected acoustic energy 732, 734 in FIG. 7 above) and more specifically, minimize any acoustic energy reflected toward the discharge region 218. The acoustic baffles 822, 824 and 832 will be described in more detail below.

Unfortunately the input acoustic baffle 822 does little to minimize or reduce the gas flow eddies and/or other disturbances 520 due to the protrusion 512 and the space 514. As a result the gas flows 804 and 806 are significantly disrupted by the gas flow eddies 520 from the protrusion 512 and the space 514.

Figure 9:
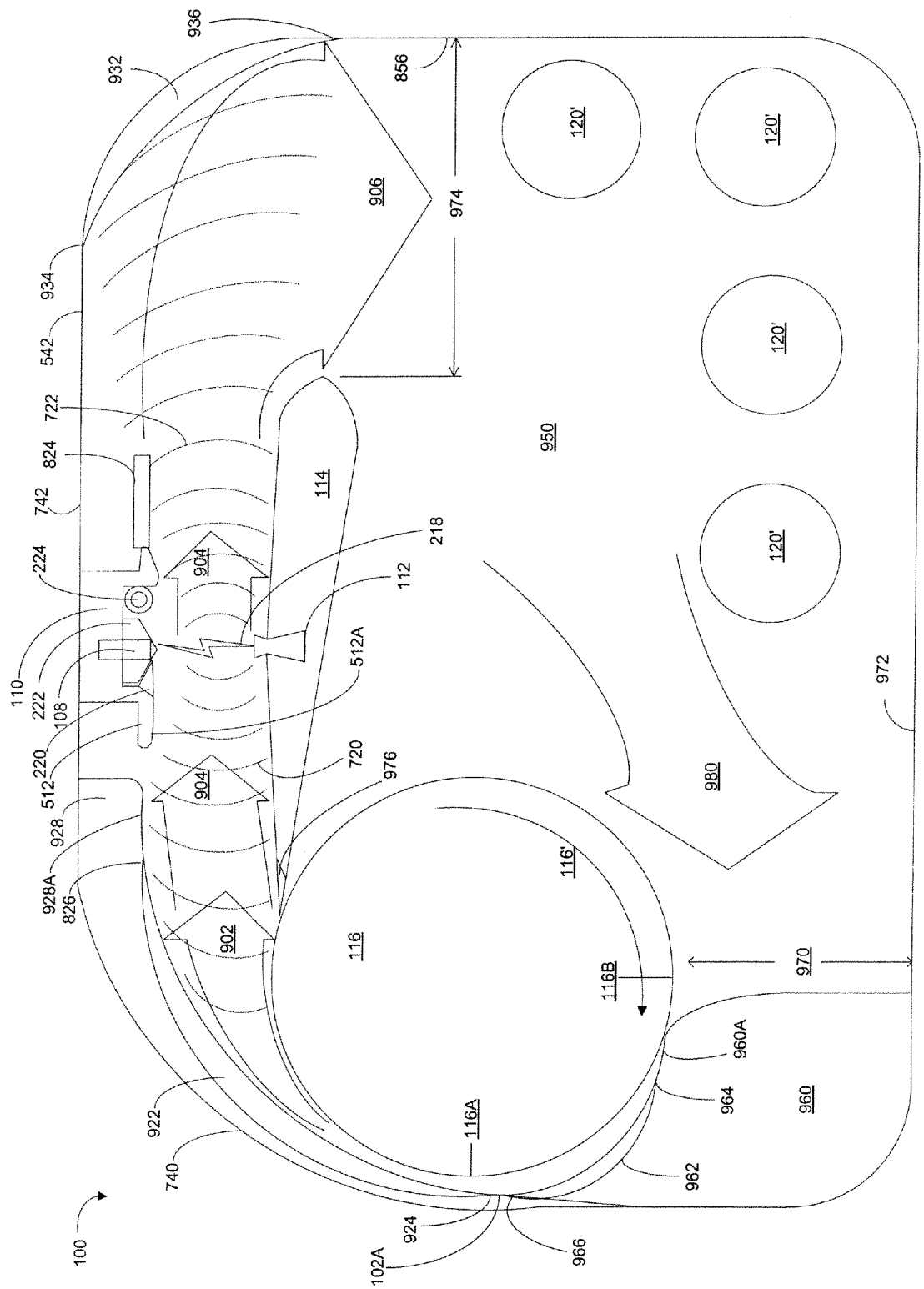
FIG. 9 is a side view of input acoustic baffle within the gas discharge laser chamber, in accordance with aspects of an embodiment of the disclosed subject matter.

FIG. 9 is a side view of input acoustic baffle 922 within the gas discharge laser chamber 100, in accordance with aspects of an embodiment of the disclosed subject matter. As described in FIG. 8 above, input side acoustic baffle 822 did little to minimize or reduce the gas flow eddies and/or other disturbances 520 due to the protrusion 512 and the space 514. An offset surface 928 added to the input side acoustic baffle 922, otherwise substantially similar to acoustic input side baffle 822 described above, aligns a trailing edge 826 of the input side acoustic baffle with the surface 512A of the protrusion 512. The offset surface 928 substantially eliminates the gas flow eddies and/or other disturbances 520 due to the protrusion 512 and the space 514 described in FIGS. 5 and 8 above. A smoothing filler 220 in the cathode support 110 substantially eliminates or mitigates acoustic energy reflections 752, described in FIG. 7 above, toward the discharge region 218.

An optional acoustic baffle 962 can also be added between the wall 102A of the gas discharge laser chamber 100 and the fan 116. The optional acoustic baffle 962 can extend substantially around a portion of the circumference of the fan 116. An optional second offset surface 960 can also be included to further extend the optional acoustic baffle 962 away from the wall 102A. By way of example the optional second offset surface 960 can extend the optional acoustic baffle 962 from about a 9 o'clock portion 116A to about a 6 o'clock portion 116B of the fan 116. It should be understood that while the optional acoustic baffle 962 is illustrated separate from input side acoustic baffle 922, the two acoustic baffles could be a single continuous acoustic baffle from the trailing edge 826 of the input acoustic baffle to as far as the 6 o'clock portion 116B of the fan 116. Further, while the input side acoustic baffle 922 and the optional acoustic baffle 962 are described in two parts, it should be understood that the acoustic baffles could be manufactured in multiple segments divided along the length of the discharge region 218 and/or divided in segments along the inner surface 102A and 740 of the gas discharge laser chamber 100.

A significant point of the design of the acoustic baffles 922, 932 and 962 is that each of the acoustic baffles include a vanishing point at the both the leading edge and the trailing edge of the acoustic baffles. By way of example, acoustic baffle 932 has a leading edge 934 that is the edge of the acoustic baffle that first encounters the gas flowing toward the acoustic baffle. Similarly, acoustic baffle 932 has a trailing edge 936 that is the edge of the acoustic baffle that last encounters the gas flowing past the acoustic baffle. Each of the leading edge 934 and trailing edge 936 of the acoustic baffle 932 vanishes or smoothly transitions to the respective inner top surface 542 and inner wall surface 856 of the gas discharge laser chamber 100.

Similarly, input side acoustic baffle 922 has a leading edge 824 that is the edge of the input side acoustic baffle that first encounters the gas flowing toward the input side acoustic baffle from the fan 116. The input side acoustic baffle 922 also has a trailing edge 826 that is the edge of the input side acoustic baffle that last encounters the gas flowing past the input side acoustic baffle. Each of the leading edge 824 and trailing edge 826 of the input side acoustic baffle 922 vanishes or smoothly transitions to the respective inner wall 102A surface of the gas discharge laser chamber 100 and the surface 928A of the step 928.

Similarly, optional acoustic baffle 962 as a leading edge 964 that is the edge of the optional acoustic baffle that first encounters the gas flowing toward the optional acoustic baffle. Optional acoustic baffle 962 also has a trailing edge 966 that is the edge of the optional acoustic baffle that last encounters the gas flowing past the optional acoustic baffle. Each of the leading edge 964 and trailing edge 966 of the optional acoustic baffle 962 vanishes or smoothly transitions to the respective surface 960A of the optional second offset surface 960 and inner wall 102A surface of the gas discharge laser chamber 100. It should also be understood that the optional acoustic baffle 962 could be formed in a smooth continuation of the input side acoustic baffle 822 such that the effective leading edge of the input side acoustic baffle is the leading edge 964 of the optional acoustic baffle and the effective trailing edge of the combined input side acoustic baffle would be the trailing edge 826.

Additional improvements to the gas flow through the gas discharge laser chamber 100 include moving the heat exchangers 120' closer to the wall 856 and the bottom 972. Moving the heat exchangers 120' closer to the wall 856 and the bottom 972 of the gas discharge laser chamber 100 reduces the restrictions to the gas flow 980 in the space 950 and moves the heat exchangers 120' away from the anode support 114, effectively increasing the distance 974 between the anode support and the chamber wall 856.

Yet another improvement to the gas flow through the gas discharge laser chamber 100 can include moving the fan 116 closer to the wall 102A and adding an extension 976 to the anode support 114. The efficiency of the fan 116 can be increased by reducing the volume between the fan and the wall 102A.

Still another gas flow improvement could include moving the fan 116 further away from the bottom 972 of the gas discharge laser chamber 100. By way of example the dimension 970 shown in FIG. 9 can be increased to a value greater than the dimension 370 shown in FIG. 3. This increased volume below the fan 116 reduces the turbulence in the gas flow 980. The reduced turbulence the gas flow 980 allows the fan 116 to collect the gas flow 980 more efficiently.

Figure 10B:
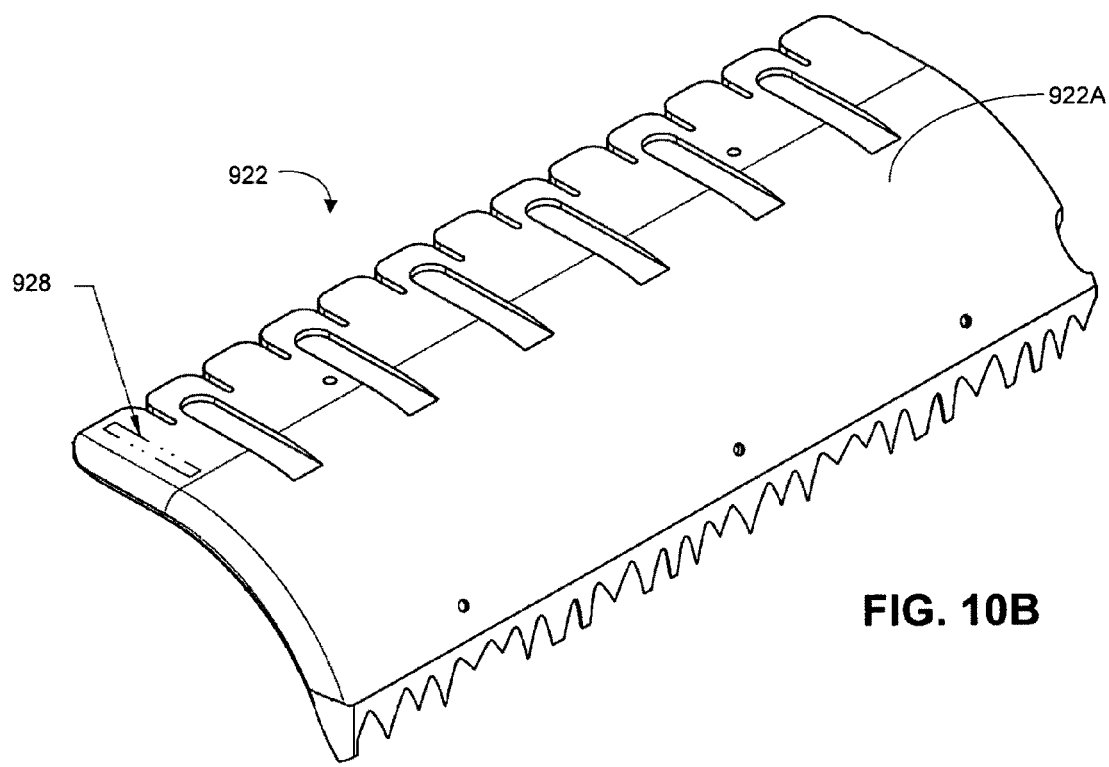
FIGS. 10A-10E are detailed views of the input side acoustic baffle, in accordance with aspects of an embodiment of the disclosed subject matter.
Figure 10A:
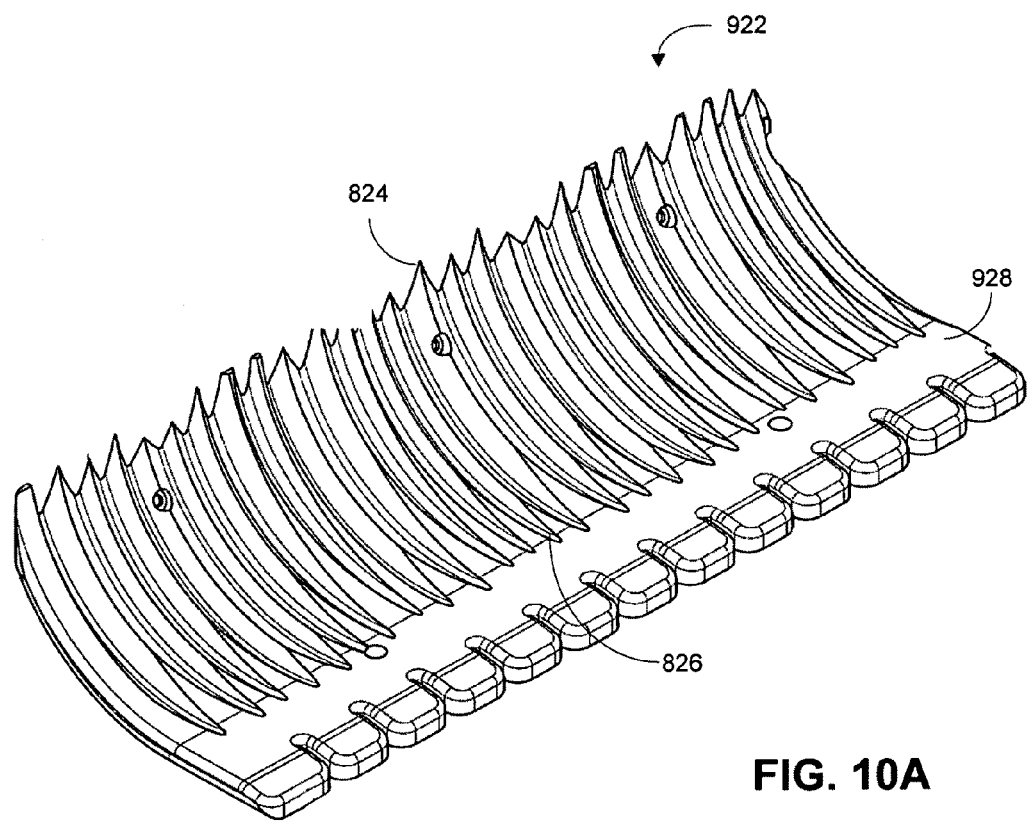
Figure 10C:
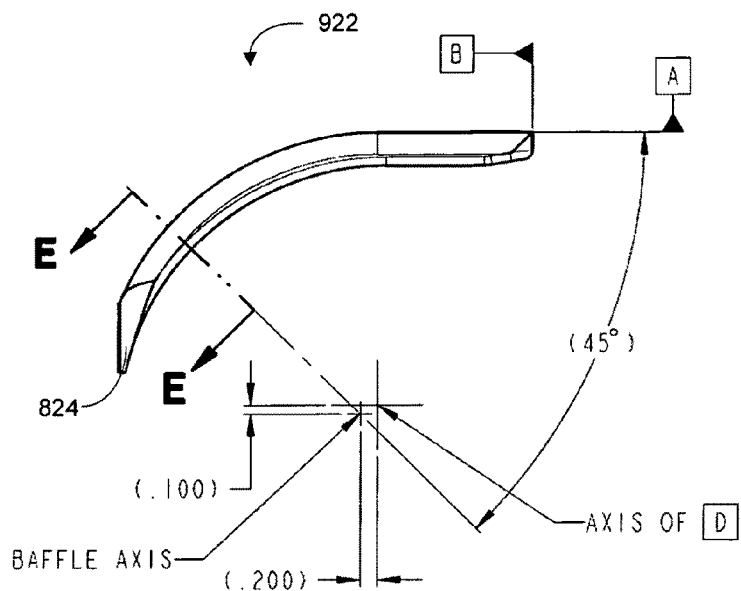
Figure 10D:
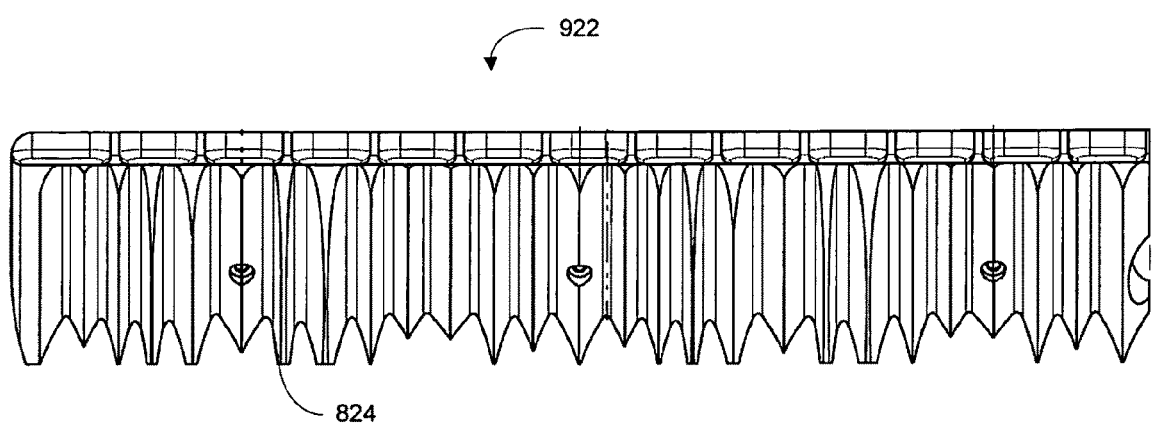
Figure 10E:
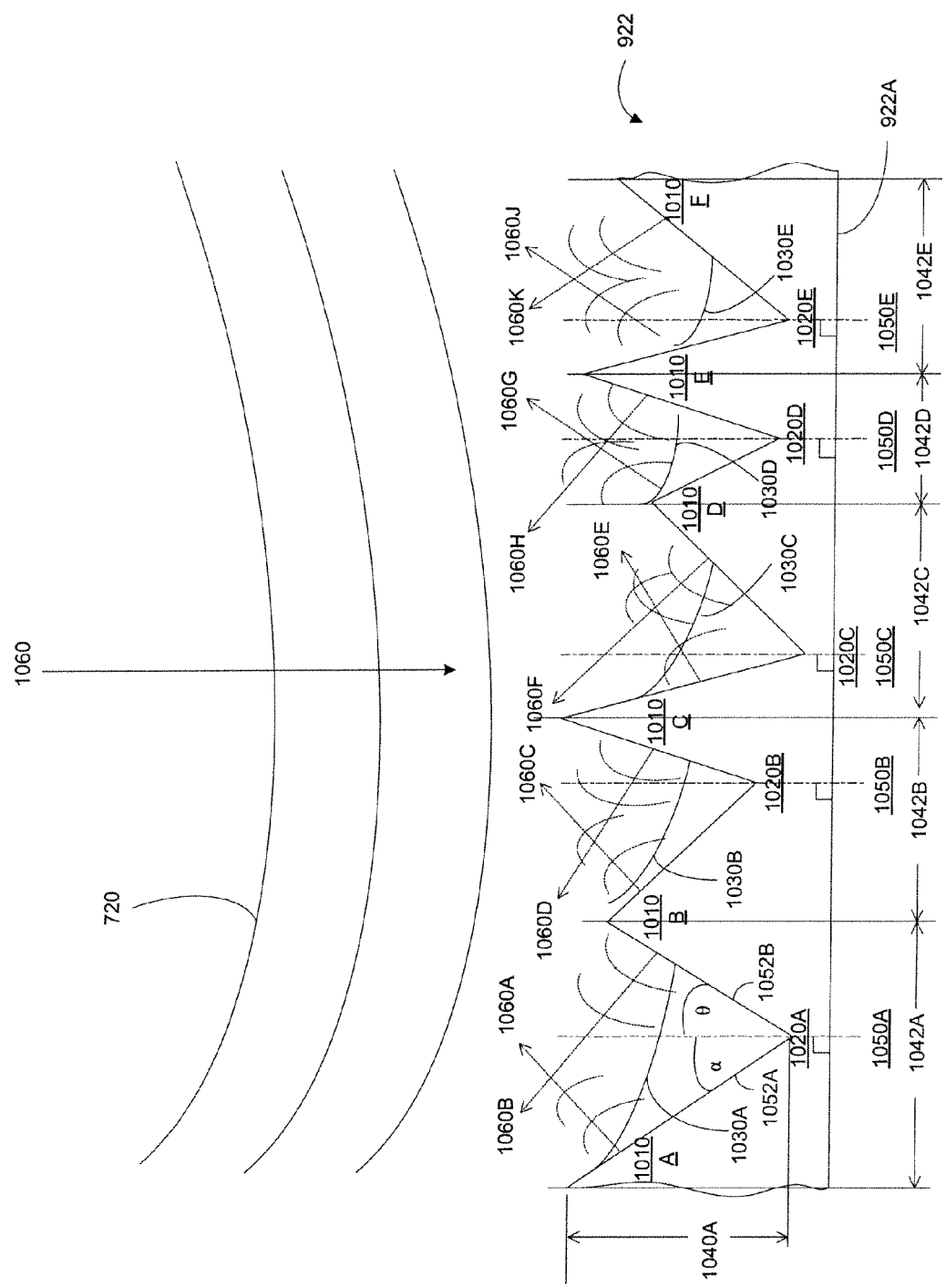

FIGS. 10A-10E are detailed views of the input side acoustic baffle 922, in accordance with aspects of an embodiment of the disclosed subject matter. The back surface 922A of the input side acoustic baffle 922, curves to conform to the inner surface 740 of the gas discharge laser chamber 100. Referring to FIG. 10E, shows a cross-section E-E of the input side acoustic baffle 922. The cross-section E-E of the input side acoustic baffle 922 is typical of all of the audio baffles 804, 832 and 962. The cross-section E-E of the input side acoustic baffle 922 shows a series of ridges 1010A-F and a corresponding series of trenches 1020A-E.

A corresponding peak to trench depth 1040A-E has a maximum value of between about 0.1 and about 0.3 inch (about 2.5 to about 7.5 mm). As described above, the acoustic baffles 822, 832 and 962 gradually reduce from a maximum value to terminate at the respective leading edge and trailing edge at corresponding vanishing points. The specific depth of a selected peak to an adjacent trench is a random selection within the range of maximum values of the trench depth 1040A-E. Adjacent peak to trench depths can be the same or different however more random adjacent trench depths 1040A-E tends to yield better results than less random adjacent trench depths.

A pitch 1042A-E describes a dimension between two adjacent ridges. By way of example, pitch 1042A is a dimension between ridge 1010A and ridge 1010B. The pitch 1042A-E dimension is also random and can occur within a range of between about 0.3 and about 0.7 inch (about 7.5 and about 18 mm). As with adjacent peak to trench depths, adjacent pitches 1042A-E can be the same or different however more random adjacent pitches 1042A-E tends to yield better results than less random adjacent pitches.

The angle of each face of a trench relative to a bisecting centerline is also a random value with a limitation that both of the angles cannot be 45 degrees. By way of example, the trench 1020A is divided by centerline 1050A that is perpendicular to the back surface of the acoustic baffle. Centerline 1050A forms angle α with trench face 1052A. Similarly, centerline 1050A forms angle θ with trench face 1052B. Angle α and angle θ can be any randomly selected angle between about 20 degrees and about 60 degrees with the limitation that only one of angle α and angle θ can be equal to 45 degrees.

The random values of the trench face angles, the trench depths and ridge pitches dissipate audio energy 720 and 722 directed toward the acoustic baffles 804, 822, 832 and 962. The combination of the random trench depth 1040 and the random ridge pitch 1042A-E break up the acoustic energy 720 and 722 into random sized acoustic energy amounts. The combination of the random trench depth 1040A-E and the random angle of each trench face reflect the divided acoustic energy amounts toward random directions. As a result, acoustic energy 720 and 722 is not reflected in any one particular direction in a sufficient to quantity to interfere with the gas flow 902, 904 and 906 around the gas discharge laser chamber 100 as shown in FIG. 9.

Figure 11:
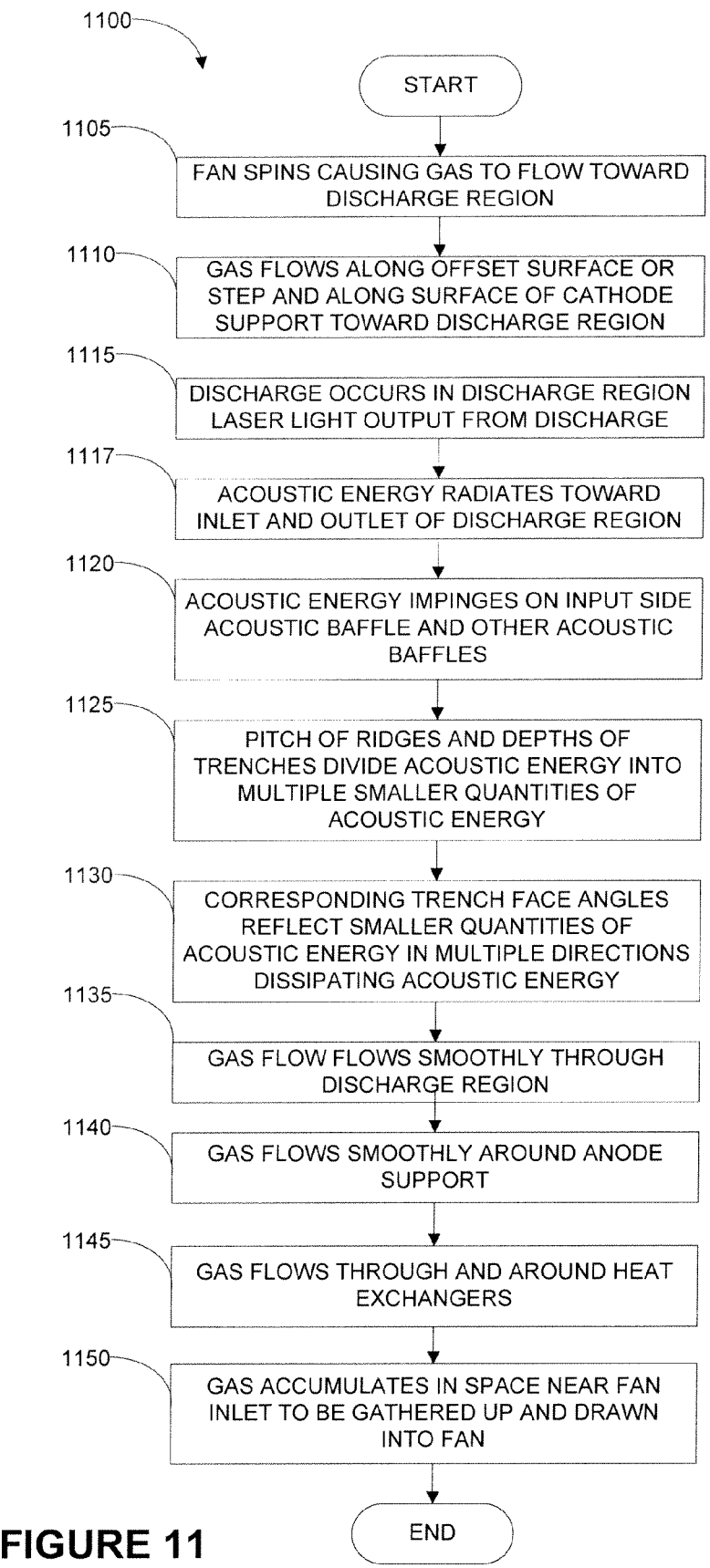
FIG. 11 is a flowchart of the method and operations of the gas flow through the gas discharge laser chamber, in accordance with aspects of an embodiment of the disclosed subject matter.

FIG. 11 is a flowchart of the method and operations 1100 of the gas flow through the gas discharge laser chamber 100, in accordance with aspects of an embodiment of the disclosed subject matter. In an operation 1105 the fan 116 is spinning in a direction 116' which causes gas flow 902 to flow toward the discharge region 218. In an operation 1110 the gas flow 904 flows along the step 928 and along the surface 114' of the anode support 114 toward the discharge region 218.

In an operation 1115, a discharge occurs in the discharge region 218. The discharge produces laser light that is output. The discharge also produces acoustic energy 720, 722 radiating, respectively, toward the inlet and the outlet of the discharge region 218 in operation 1117.

In an operation 1120, the acoustic energy 720 impinges on the input side acoustic baffle 922 and the acoustic energy 722 impinges on the acoustic baffles 824 and 832. Referring to FIG. 10E the acoustic energy 720 is directed toward input side acoustic baffle 922 from a direction 1060. In an operation 1125, the pitch of the ridges 1010A-F and the depths 1040A-E of the trenches divide the acoustic energy 720 into multiple smaller quantities of acoustic energy 1030A-E. The corresponding angles of the trench faces 1052A-K reflect the smaller quantities of acoustic energy 1030A-E in multiple corresponding directions 1060A-K effectively dissipating the acoustic energy 720 in an operation 1130. The acoustic energy 722 is similarly dissipated by acoustic baffles 824 and 832 in operations 1120-1130.

In an operation 1135, the gas flow 904 flows smoothly through the discharge region 218, between the electrodes 108, 112. Once past the electrodes 108, 112, the gas flows 906 smoothly around the anode support 114 in an operation 1140.

In an operation 1145, the gas flow 906 flows through and around the heat exchangers 120, 120'. Once past the heat exchangers 120, 120' the gas 980 accumulates in the space 950 to then be gathered up and drawn into the fan 116 in an operation 1150. The cycle of the gas flow through the gas discharge laser chamber 100 repeats as the fan 116 continues to spin in direction 116' and the discharges continue to occur in the discharge region 218.

Figure 12:
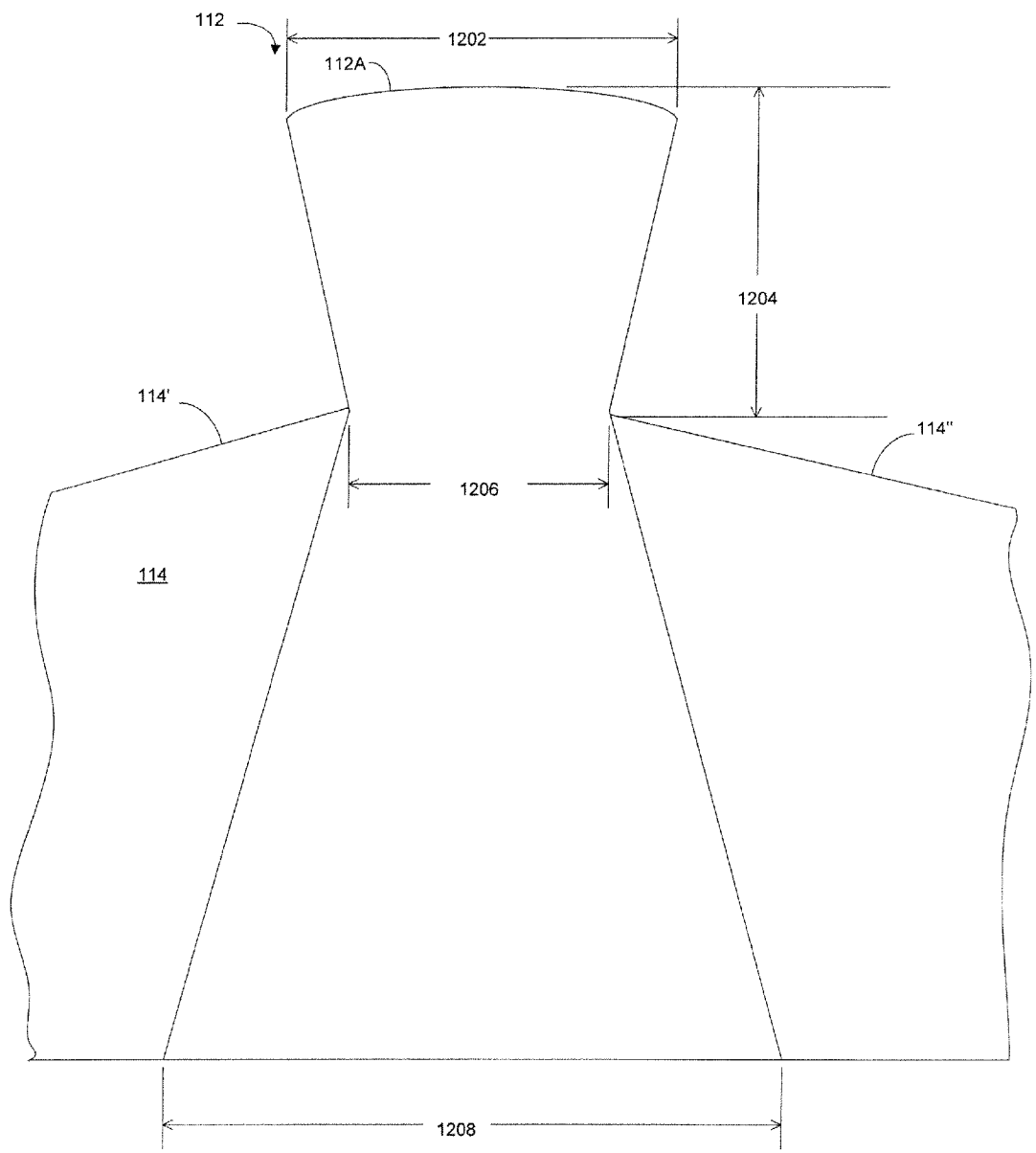
FIG. 12 is a detailed view side sectional of an extended height anode in accordance with aspects of an embodiment of the disclosed subject matter.

FIG. 12 is a detailed view side sectional of an extended height anode 112 in accordance with aspects of an embodiment of the disclosed subject matter. As described above one of the limiting factors of a service life of a gas discharge laser chamber 100 is the amount of material in the electrodes 108, 112 because the electrodes erode slightly each discharge in the discharge region. Therefore, one of the ways of extending the service life of the gas discharge laser chamber 100 is to extend the life of the electrodes 108, 112. The extended anode 112 is described in FIG. 12 but an extended cathode is substantially similar.

The extended anode 112 has an extended height 1204 above the surfaces 114', 114" of the anode support 114 as compared to a conventional anode. By way of example the conventional anode has a height of approximately 1.8 mm above the surfaces 114', 114" of the anode support 114 where the extended anode 112 has an extended height 1204 of about 2.8 mm above the surfaces 114', 114" of the anode support 114.

The extended anode 112 has an hourglass cross-section shape having a narrower width 1206 in a mid portion and a wider width 1208 at a bottom portion and at a top portion 1202. By way of example, the mid portion width 1206 is a dimension of about 2.64 mm where the top portion width 1202 is about 3.05 mm. Should be noted conventional anode also has a top width of about 3.05 mm. Further, the portion of the extended anode 112 below the surfaces 114', 114" of the anode support 114 is substantially similar to the corresponding portion of a conventional anode.

The inclination of the surfaces 114', 114" of the anode support 114 can optionally be adjusted relative to the extended anode 112 so as to enhance gas flow over the extended height of the extended anode. By way of example, the leading edge surface 114' may have a steeper incline rising toward the anode at a greater angle than would be necessary for a shorter, conventional anode. The angle on the trailing surface 114" could be increased or decreased, as necessary to smooth the gas flow over the extended anode.

The top surface 112A of the anode 112 can optionally include a slightly rounded cross-section shape as shown. Alternatively, the top surface 112A of the anode 112 can optionally include a substantially flat cross-section shape (not shown).

The 1.0 mm additional height provides the additional anode material for supporting many billions of pulses more than the shorter, conventional anode. Simply extending the anode would not be sufficient as the extended anode's height increase would disrupt gas flow through the discharge region more than the conventional anode would. Therefore, the extended anode would require a slower pulse rate than the shorter conventional anode or improved gas flow through the discharge region. As discussed above, the acoustic baffles and other improvements to the gas discharge laser chamber have significantly improved gas flow through the discharge region thereby allowing the use of an extended anode 112 (and/or cathode 108) to support additional discharges at 6000 or more discharges per second.

Each of the following U.S. Patents and U.S. Published Patent applications are commonly owned by the assignee of the present application and hereby incorporates in their entirety by reference for all purposes: U.S. Pat. No. 6,018, 537, entitled "Reliable, Modular, Production Quality Narrow-Band High Rep Rate F2 Laser," by Hofmann et al, and U.S. Pat. No. 6,128,323, entitled, "Reliable Modular Production Quality Narrow-Band High Rep Rate Excimer Laser", by Myers et al, and U.S. Pat. No. 6,212,211, entitled, "Shock Wave Dissipating Laser Chamber", by Azzola et al, and U.S. Pat. No. 6,330,261, entitled, "Reliable, Modular, Production Quality Narrow-Band High Rep Rate ArF Excimer Laser", by Ishihara et al, and U.S. Pat. No. 6,442,181, entitled, "Extreme repetition rate gas discharge laser", by Oliver et al, and U.S. Pat. No. 6,477,193, entitled, "Extreme Repetition Rate Gas Discharge Laser with Improved Blower Motor", by Oliver et al, and U.S. Pat. No. 6,549,551, entitled, "Injection Seeded Laser with Precise Timing Control", by Ness et al, and U.S. Pat. No. 6,553,049, entitled, "ArF Laser with Low Pulse Energy and High Rep", by Besaucele et al, and U.S. Pat. No. 6,567,450, entitled, "Very Narrow Band, Two Chamber, High Rep Rate Gas Discharge Laser System", by Myers et al, and U.S. Pat. No. 6,618,421, entitled, "High Repetition Rate Gas Discharge Laser With Precise Pulse Timing Control", by Das et al, and U.S. Pat. No. 6,625,191, entitled, "Very Narrow Band, Two Chamber, High Rep Rate Gas Discharge Laser System", by Knowles et al, and U.S. Pat. No. 6,654,403, entitled, "Flow Shaping Electrode With Erosion Pad For Gas Discharge Laser" by Ujazdowski et al, and U.S. Published Patent Application 20060291517, entitled, "High Pulse Repetition Rate Gas Discharge Laser", by Gillespie et al, and U.S. Published Patent Application 20070071058, entitled, "Gas Discharge Laser System Electrodes and Power Supply for Delivering Electrical Energy to Same", by Amada et al, and U.S. Published Patent Application 20050226301, entitled, "Gas Discharge Laser Chamber Improvements" by Partlo et al.

It will be further appreciated that the instructions represented by the operations in the above figures are not required to be performed in the order illustrated, and that all the processing represented by the operations may not be necessary to practice the invention.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

The invention claimed is:

1. A gas discharge laser chamber comprising:
a discharge region formed between a first electrode and a second electrode;
a tangential fan for circulating gas through the discharge region, wherein the fan is proximate to an input side of the discharge region;
an input side acoustic baffle proximate to the input side of the discharge region including:
a vanishing point leading edge;
a vanishing point trailing edge;
a gas flow smoothing offset surface aligning a gas flow from a surface of the input side acoustic baffle to an input side of a cathode support in the discharge region;
a plurality of ridges separated by a plurality of trenches, wherein the plurality of ridges and the plurality of trenches are aligned with a direction of gas flow through the discharge region, wherein the plurality of trenches include a corresponding plurality of trench faces extending from each one of the plurality of trenches to the adjacent one of the plurality of ridges and wherein each one of the plurality of trench faces forms an angle with a line normal to the acoustic baffle and centered on the corresponding one of the trenches, wherein the angle has a random measure of between about 20 and about 60 degrees.

2. The gas discharge chamber of claim 1, wherein the plurality of ridges have a random pitch between about 0.3 and about 0.7 inch.

3. The gas discharge chamber of claim 1, wherein not more than one of the corresponding angles formed by two adjacent trench faces is a 45 degree angle to the line normal to the acoustic baffle and wherein the line normal to the acoustic baffle is in common with the two adjacent trench faces.

4. The gas discharge chamber of claim 1, wherein the input side acoustic baffle has a back side and wherein the back side of the input side acoustic baffle conforms to an inner surface of the gas discharge chamber.

5. The gas discharge chamber of claim 4, wherein the back side of the input side acoustic baffle conforms to the inner surface of the gas discharge chamber substantially eliminating a space between the back side of the input side acoustic baffle and the inner surface of the gas discharge chamber.

6. The gas discharge laser chamber of claim 1, wherein each one of the plurality of trenches have a random depth from the adjacent one of the plurality of ridges of between about 0.1 and about 0.3 inch.

7. The gas discharge laser chamber of claim 1, wherein the leading edge of the input side acoustic baffle is between about a 9-o'clock portion and about a 6-o'clock portion of the fan.

8. The gas discharge laser chamber of claim 1, wherein the input side acoustic baffle is formed in a plurality of segments between the leading edge and the trailing edge of the input side acoustic baffle.

9. The gas discharge laser chamber of claim 1, further comprising a second acoustic baffle proximate to the output side of the discharge region and conforming to an inner surface of the gas discharge laser chamber.

10. The gas discharge laser chamber of claim 1, wherein the discharge region is formed between a first electrode supported in a first electrode support and a second electrode supported in a second electrode support.

11. The gas discharge laser chamber of claim 10, wherein at least one of the first electrode and the second electrode extends between about 1.8 and about 2.8 mm from a surface of the corresponding first electrode support or second electrode support.

12. The gas discharge laser chamber of claim 10, further comprising a flow smoothing and acoustic reflection mitigating filler in the first electrode support.

13. The gas discharge laser chamber of claim 1, further comprising a second offset surface at an inlet of the fan.

14. The gas discharge laser chamber of claim 1, further comprising a plurality of heat exchangers, wherein the plurality of heat exchangers are proximate to at least one of the bottom and a side opposite the fan.

15. A method of generating a laser comprising:
circulating gas through a discharge region in a gas discharge laser chamber, wherein the discharge region is formed between a first electrode and a second electrode wherein a tangential fan circulates the gas through the discharge region, wherein the fan is proximate to an input side of the discharge region, wherein the gas circulates past an input side acoustic baffle proximate to the input side of the discharge region, wherein the input side acoustic baffle includes:
a vanishing point leading edge;
a vanishing point trailing edge;
a gas flow smoothing offset surface aligning a gas flow from a surface of the input side acoustic baffle to an input side of a second electrode support in the discharge region; and
a first plurality of ridges separated by a first plurality of trenches, wherein the first plurality of ridges and the first plurality of trenches are aligned with a direction of gas flow through the discharge region and wherein the first plurality of ridges have a random pitch between about 0.3 and about 0.7 inch, wherein the plurality of trenches include a corresponding plurality of trench faces extending from each one of the plurality of trenches to the adjacent one of the plurality of ridges and wherein each one of the plurality of trench faces forms an angle with a line normal to the acoustic baffle and centered on the corresponding one of the trenches, wherein the angle has a random measure of between about 20 and about 60 degrees;

discharging in the discharge region;

outputting a laser light from the gas discharge laser chamber;

emitting an acoustic energy pulse created by the discharge;

impinging a first portion of the emitted acoustic energy pulse on the input side acoustic baffle;

dividing the first portion of the emitted acoustic energy pulse into a first plurality of smaller acoustic energy pulses, wherein each one of the first plurality of smaller acoustic energy pulses consist of a substantially random portion of the first portion of the emitted acoustic energy pulse; and reflecting each one of the first plurality of smaller acoustic energy pulses in a first plurality of directions away from the input side acoustic baffle.

16. The method of claim 15, wherein reflecting each one of the first plurality of smaller acoustic energy pulses in a first plurality of directions from the input side acoustic baffle includes reflecting more than one half of the first plurality of smaller pulses away from the discharge region.

17. The method of claim 15, wherein reflecting each one of the first plurality of smaller acoustic energy pulses in the first plurality of directions from the input side acoustic baffle includes reflecting each one of the first plurality of smaller acoustic energy pulses from the first plurality of trench faces.

18. The method of claim 17, further comprising substantially eliminating a space between the back side of the input side acoustic baffle and the corresponding inner surface of the gas discharge chamber.

19. The method of claim 15, wherein each one of the first plurality of trenches have a random depth from the adjacent one of the plurality of ridges of between about 0.1 and about 0.3 inch.

20. The method of claim 15, wherein the leading edge of the input side acoustic baffle is proximate to between about a 9-o'clock portion and about a 6-o'clock portion of the fan.

21. The method of claim 15, further comprising forming the input side acoustic baffle in a plurality of segments between the leading edge and the trailing edge of the input side acoustic baffle.

22. The method of claim 15, further comprising:

wherein circulating the gas through the discharge region includes circulating the gas past a second acoustic baffle, wherein the second acoustic baffle is proximate to a output side of the discharge region wherein the output side of the discharge region is opposite the input side of the discharge region;

impinging a second portion of the emitted acoustic energy pulse on the second acoustic baffle;

dividing the second portion of the emitted acoustic energy pulse into a second plurality of smaller acoustic energy pulses, wherein each one of the second plurality of smaller acoustic energy pulses consist of a substantially random portion of the second portion of the emitted acoustic energy pulse; and reflecting each one of the second plurality of smaller acoustic energy pulses in a second plurality of directions from the second acoustic baffle, including reflecting more than one half of the second plurality of smaller pulses away from the discharge region.

23. The method of claim 15, wherein the discharge region is formed between a first electrode supported in a first electrode support and a second electrode supported in a second electrode support.

24. The method of claim 23, wherein at least one of the first electrode and the second electrode extends between about 1.8 and about 2.8 mm from a surface of the corresponding first electrode support or second electrode support.

25. The method of claim 23, further comprising substantially filling a gas flow disrupting and acoustic reflection source in the first electrode support.

* * * * *